US011997451B2

(12) United States Patent
Liu et al.

(10) Patent No.: US 11,997,451 B2
(45) Date of Patent: May 28, 2024

(54) ACOUSTIC DEVICE

(71) Applicant: AAC Microtech (Changzhou) Co., Ltd., Changzhou (CN)

(72) Inventors: Shasha Liu, Shenzhen (CN); Xiaodong Liu, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 162 days.

(21) Appl. No.: 17/876,509

(22) Filed: Jul. 28, 2022

(65) Prior Publication Data

US 2023/0209249 A1 Jun. 29, 2023

(51) Int. Cl.
*H04R 1/28* (2006.01)

(52) U.S. Cl.
CPC .................................... *H04R 1/288* (2013.01)

(58) Field of Classification Search
CPC .... H04R 1/086; H04R 2410/07; H04R 1/288; H04R 1/2876; H04R 1/02; H04R 1/2869; H04R 1/2892; H04R 2410/03
USPC ....... 381/71.1, 359, 346, 170; 181/284, 207, 181/256, 175, 252
See application file for complete search history.

(56) References Cited

U.S. PATENT DOCUMENTS

2017/0280234 A1* 9/2017 Choi ...................... H04R 1/025

* cited by examiner

*Primary Examiner* — Norman Yu
(74) *Attorney, Agent, or Firm* — W&G Law Group

(57) ABSTRACT

Provided is an acoustic device, having front and rear surfaces. The acoustic device includes: an enclosure housing being a metal housing; an acoustic component mounted in the enclosure housing, the acoustic component and the enclosure housing cooperate to form front and rear sound cavities, and the front sound cavity is communicated with the sound outlet; an isolation component mounted in the rear sound cavity, the isolation component and the enclosure housing enclose to form a filling cavity configured to be filled with a sound-absorbing material; and at least one buffer attached to an inner surface of the enclosure housing defining the filling cavity, the buffer is configured to reduce noise generated from collision of the sound-absorbing material with the enclosure housing. The acoustic device can reduce collision of the sound-absorbing material with the metallic enclosure housing, thereby reducing noise generated, so as to improve acoustic performance.

10 Claims, 8 Drawing Sheets

A-A

B
~

ACOUSTIC DEVICE

TECHNICAL FIELD

The present disclosure relates to the field of acoustoelectric conversion technologies and, in particular, to an acoustic device.

BACKGROUND

An acoustic device is widely used in a variety of electronic devices and generally includes an acoustic component for producing sound and an enclosure housing covering the acoustic component. The acoustic component and the enclosure housing are matched to form a front sound cavity and a rear sound cavity. The rear sound cavity is provided with a filling cavity configured to be filled with a sound-absorbing material, so as to increase an effective volume of the rear sound cavity of the acoustic device, which is an effective way to improve acoustic performance.

At present, a metallic enclosure housing is becoming a trend, but collision of the sound-absorbing material with the metallic enclosure housing easily produces noise that cannot be ignored, which adversely affects the acoustic performance of the acoustic device.

SUMMARY

The present disclosure provides an acoustic device, so as to solve the problem of noise generated from collision of the sound-absorbing material with the metallic housing in the existing acoustic device.

The present disclosure provides an acoustic device, having a front surface and a rear surface, the front surface being provided with a sound outlet. The acoustic device includes: an enclosure housing that is a metal housing; an acoustic component mounted in the enclosure housing, the acoustic component and the enclosure housing cooperate to form a front sound cavity and a rear sound cavity, and the front sound cavity is communicated with the sound outlet; an isolation component mounted in the rear sound cavity, the isolation component and the enclosure housing enclose to form a filling cavity configured to be filled with a sound-absorbing material; and at least one buffer attached to an inner surface of the enclosure housing defining the filling cavity, the buffer is configured to reduce noise generated from collision of the sound-absorbing material with the enclosure housing.

As an improvement, the buffer has a mesh structure.

As an improvement, the buffer is glued to the inner surface of the enclosure housing.

As an improvement, the enclosure housing includes a front wall located on the front surface, a bottom wall located on the rear surface, and a side wall connecting the front wall to the bottom wall, a side surface of the acoustic component is spaced from the side wall of the enclosure housing, the isolation component closely fits the side surface, and the isolation component and the front wall, the side wall and the bottom wall of the enclosure housing together enclose to form the filling cavity.

As an improvement, the isolation component is provided with at least one hollow portion to enable the side surface of the acoustic component to be exposed to the filling cavity.

As an improvement, the isolation component includes a support member, the support member is provided with at least one opening, the isolation component further includes an isolation member attached to the support member, the isolation member covers the opening, and the isolation member has a mesh structure.

As an improvement, the acoustic device further includes a cushion edge arranged in the enclosure housing and fixed to the enclosure housing, the cushion edge is made of a nonmetallic material, and the isolation component is fixed to the cushion edge.

As an improvement, the cushion edge is arranged on an inner surface of the front wall of the enclosure housing, and the acoustic component abuts against and is fixed to the cushion edge.

As an improvement, the acoustic component includes an acoustic unit and a front cover covering one side of the acoustic unit close to the front surface, and the front cover is provided with the sound outlet; and the front wall of the enclosure housing is provided with an avoiding opening to receive the front cover.

As an improvement, the acoustic unit includes a diaphragm, the diaphragm is opposite to the front cover and defines the front sound cavity together with the front cover, one side of the diaphragm close to the rear surface defines the rear sound cavity together with the enclosure housing, the isolation component divides the rear sound cavity into a first rear sound cavity and a second rear sound cavity, and the second rear sound cavity is the filling cavity.

The present disclosure has the following beneficial effects.

A buffer is arranged in the filling cavity, which can reduce collision of the sound-absorbing material with the metallic enclosure housing, thereby reducing noise generated from the collision, so as to improve the acoustic performance.

It is to be understood that the general description above and the detailed description below are only examples and cannot limit the present disclosure.

The accompanying drawings herein are incorporated in and constitute a part of the specification, which illustrate embodiments consistent with the present disclosure and, together with the description, serve to explain the principles of the present disclosure.

DESCRIPTION OF EMBODIMENTS

In order to better understand the technical solution of the present disclosure, embodiments of the present disclosure are described in detail below with reference to the accompanying drawings.

It should be made clear that the embodiments described are only some rather than all of the embodiments of the present disclosure. All other embodiments acquired by those of ordinary skill in the art without creative efforts based on the embodiments in the present disclosure fall within the protection scope of the present disclosure.

The terms used in the embodiments of the present disclosure are intended only to describe particular embodiments and are not intended to limit the present disclosure. As used in the embodiments of the present disclosure and the appended claims, the singular forms of "a/an", "said", and "the" are intended to include plural forms, unless otherwise clearly specified by the context.

It is to be understood that the term "and/or" used herein is merely an association relationship describing associated objects, indicating that three relationships may exist. For example, A and/or B indicates that there are three cases of A alone, A and B together, and B alone. In addition, the character "/" herein generally means that associated objects before and after "/" are in an "or" relationship.

It is to be noted that the location terms such as "above", "below", "left", and "right" described in the embodiments of the present disclosure are described with reference to the perspectives shown in the accompanying drawings, and should not be construed as limitations on the embodiments of the present disclosure. In addition, in the context, it is to be further understood that, when one element is referred to as being connected "above" or "below" another element, the one element may be directly connected "above" or "below" another element, or connected "above" or "below" another element via an intermediate element.

According to embodiments of the present disclosure, as shown in FIG. 1 to FIG. 9, an acoustic device 100 has a front surface 100A and a rear surface 100B. The front surface 100A is a sound output surface.

Figure 3:
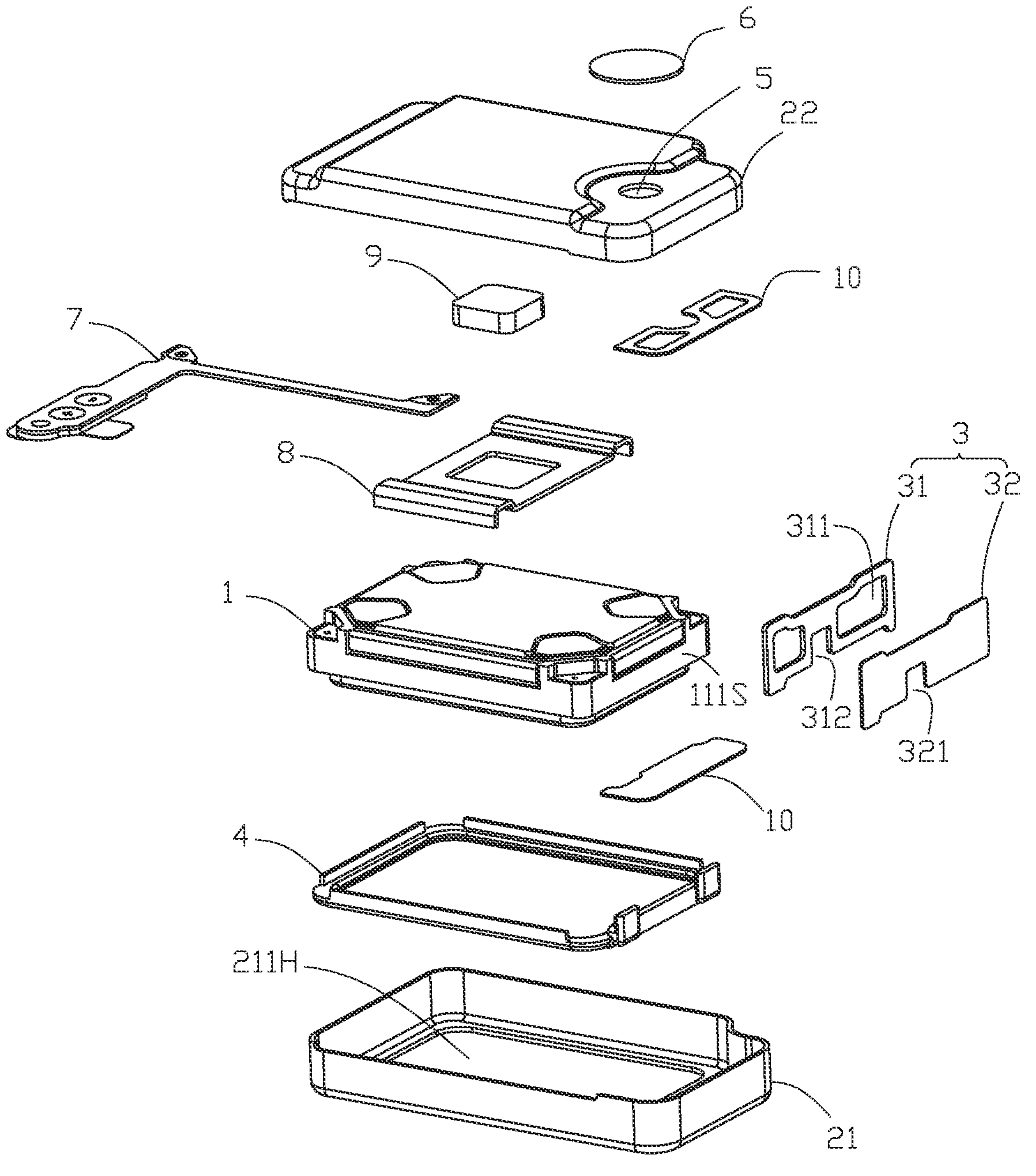
FIG. 3 is an exploded view of an acoustic device according to the present disclosure.
Figure 8:
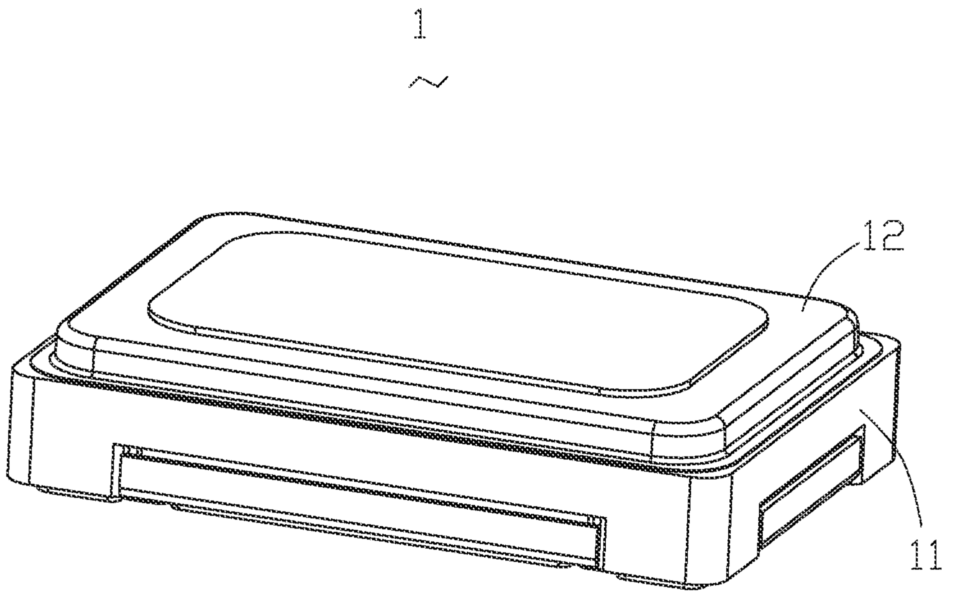
FIG. 8 is a schematic diagram of a three-dimensional structure of an acoustic component of an acoustic device according to the present disclosure.
Figure 9:
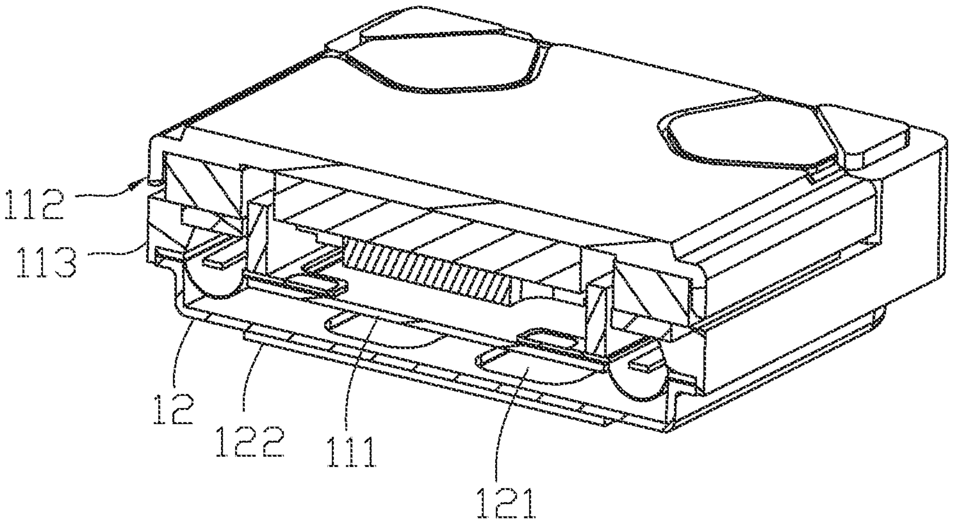
FIG. 9 is a three-dimensional sectional view of the acoustic component of an acoustic device according to the present disclosure.

As shown in FIG. 3 and FIG. 8 to FIG. 9, the acoustic device 100 includes an acoustic component 1 for vibrating to produce sound. The acoustic component 1 includes an acoustic unit 11 and a front cover 12 covering one side of the acoustic unit 11 close to the front surface 100A. The front cover 12 is provided with a sound outlet 121 and an air-permeable mesh 122 covering the sound outlet 121. The acoustic unit 11 includes a diaphragm 111 for vibrating, a magnetic circuit unit 112 to drive the diaphragm 111 to vibrate, and a frame 113 to support the diaphragm 111 and the magnetic circuit unit 112.

As shown in FIG. 1 to FIG. 5, the acoustic device 100 further includes an enclosure housing 2 covering the acoustic component 1. The enclosure housing 2 is a metal housing, including a first housing 21 close to the front surface 100A and a second housing 22 close to the rear surface 100B. The first housing 21 and the second housing 22 are matched to form a space to receive the acoustic component 1. The first housing 21 has a front wall 211 close to the front surface 100A and a first side wall 212 extending from the front wall 211 to the rear surface 100B. The front wall 211 is provided with an avoiding opening 211H. The second housing 22 has a bottom wall 221 opposite to the front wall 211 and a second side wall 222 extending from the bottom wall 221 to the front surface 100A. The first side wall 212 and the second side wall 222 are formed as side walls of the enclosure housing 2. It is to be noted that, the present disclosure does not limit the number and structure of parts forming the enclosure housing, as long as a receiving space can be formed.

As shown in FIG. 1 and FIG. 4 to FIG. 7, after the acoustic component 1 is mounted to the enclosure housing 2, the front cover 12 of the acoustic component 1 is received in the avoiding opening 211H of the enclosure housing 2. One side surface 111S of the acoustic component 1 is opposite to and spaced from the side wall of the enclosure housing 2. The diaphragm 111 of the acoustic component 1 is opposite to the front cover 12 and together enclose to define a front sound cavity C1. The front sound cavity C1 is communicated with the sound outlet 121. One side of the diaphragm 111 close to the rear surface 100B defines a rear sound cavity C2 with the enclosure housing 2.

Figure 6:
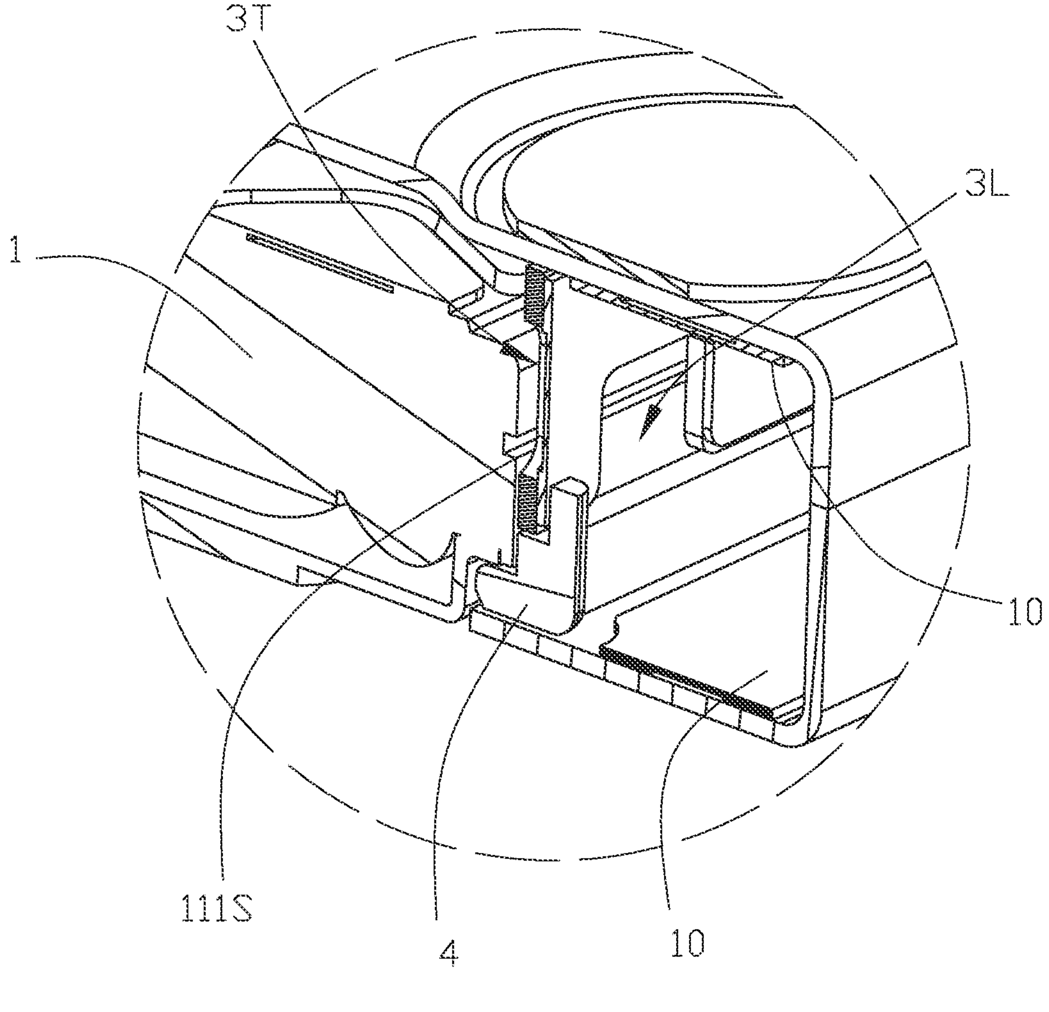
FIG. 6 is a partial enlarged view of FIG. 4.

As shown in FIG. 3 and FIG. 6, the acoustic device 100 further includes an isolation component 3. The isolation component 3 includes a support member 31. The support member 31 has a plate structure, and is provided with a first opening 311 and a second opening 312. The isolation component further includes an air-permeable isolation member 32. The air-permeable isolation member 32 has a mesh structure. The air-permeable isolation member 32 covers the first opening 311, forming an air-permeable portion 3T. The air-permeable isolation member 32 is provided with a third opening 321, and the third opening 321 is directly penetrated to the second opening 312, forming a hollow portion 3L. The air-permeable isolation member 32 is attached to the support member 31 by an adhesive.

Figure 7:
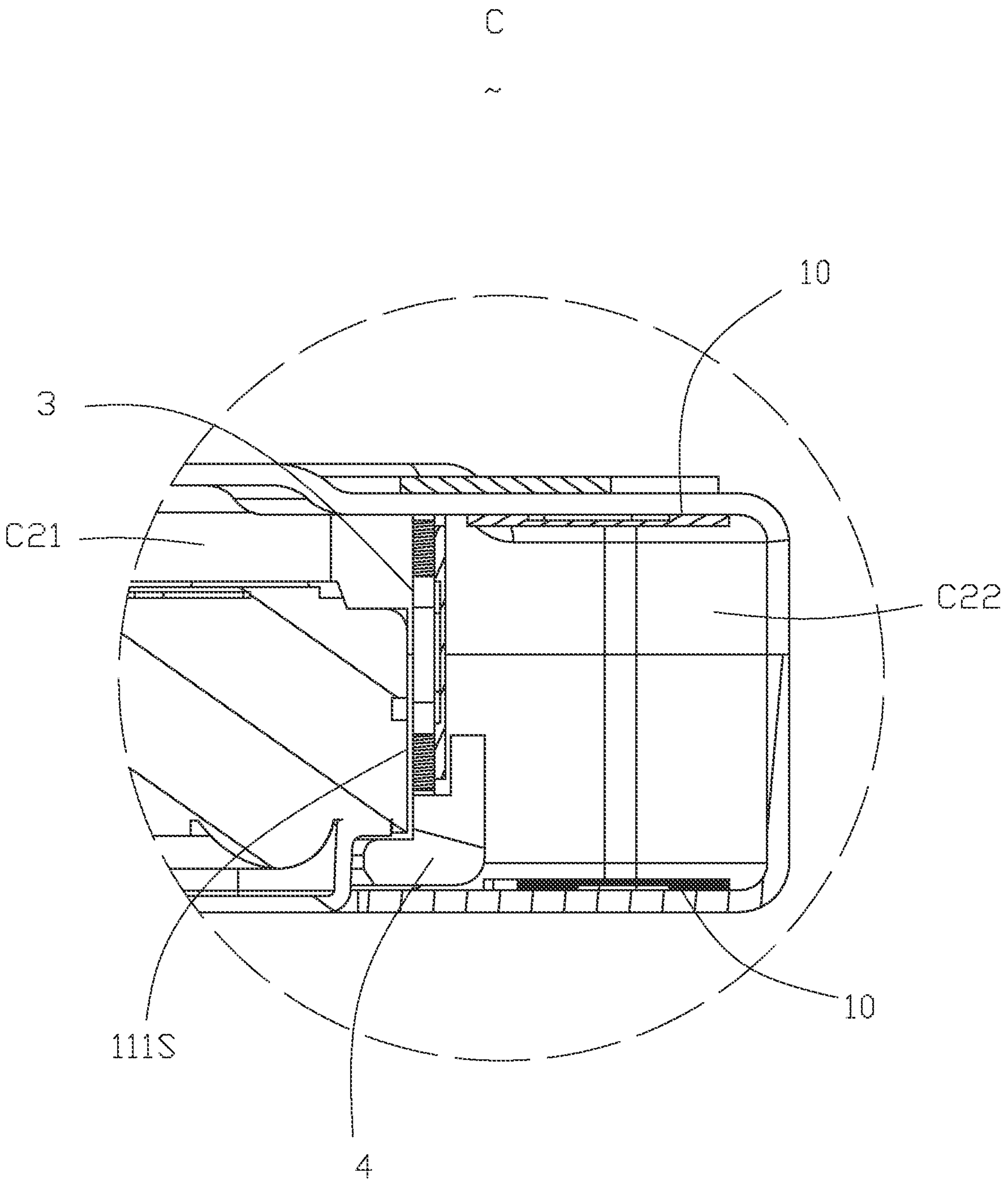
FIG. 7 is a partial enlarged view of FIG. 5.

As shown in FIG. 7, in an embodiment, the isolation component 3 contacts the side surface 111S of the acoustic component 1 to divide the rear sound cavity C2 into a first rear sound cavity C21 and a second rear sound cavity C22. The second rear sound cavity C22 is located on a side surface of the acoustic component 1. The air-permeable portion 3T of the isolation component 3 is communicated with the first rear sound cavity C21 and the second rear sound cavity C22. The hollow portion 3L is arranged at a position where the isolation component 3 closely contacts the side surface 111S of the acoustic component 1, to enable the side surface 111S of the acoustic component 1 to be exposed from the second rear sound cavity C22. The second rear sound cavity C22 is formed as a filling cavity configured to be filled with a sound-absorbing material. The hollow portion 3L is also configured to be filled with the sound-absorbing material to increase the filling volume of the sound-absorbing material.

As shown in FIG. 3 and FIG. 7, the acoustic device 100 further includes a cushion edge 4 assembled in the enclosure housing and configured to mount the acoustic component 1 and the isolation component 3. The cushion edge 4 is arranged on an inner side of the front wall 211 of the front housing 21 and is fixed to an edge of the front cover 12. The cushion edge 4 is made of a plastic structure and can be easily shaped. Matching of the cushion edge with the metallic enclosure housing 2 is more conducive to mounting and fixing of the acoustic device. It is to be noted that, the present disclosure neither limits the use of the cushion edge nor limits the structure and material of the cushion edge.

Figure 2:
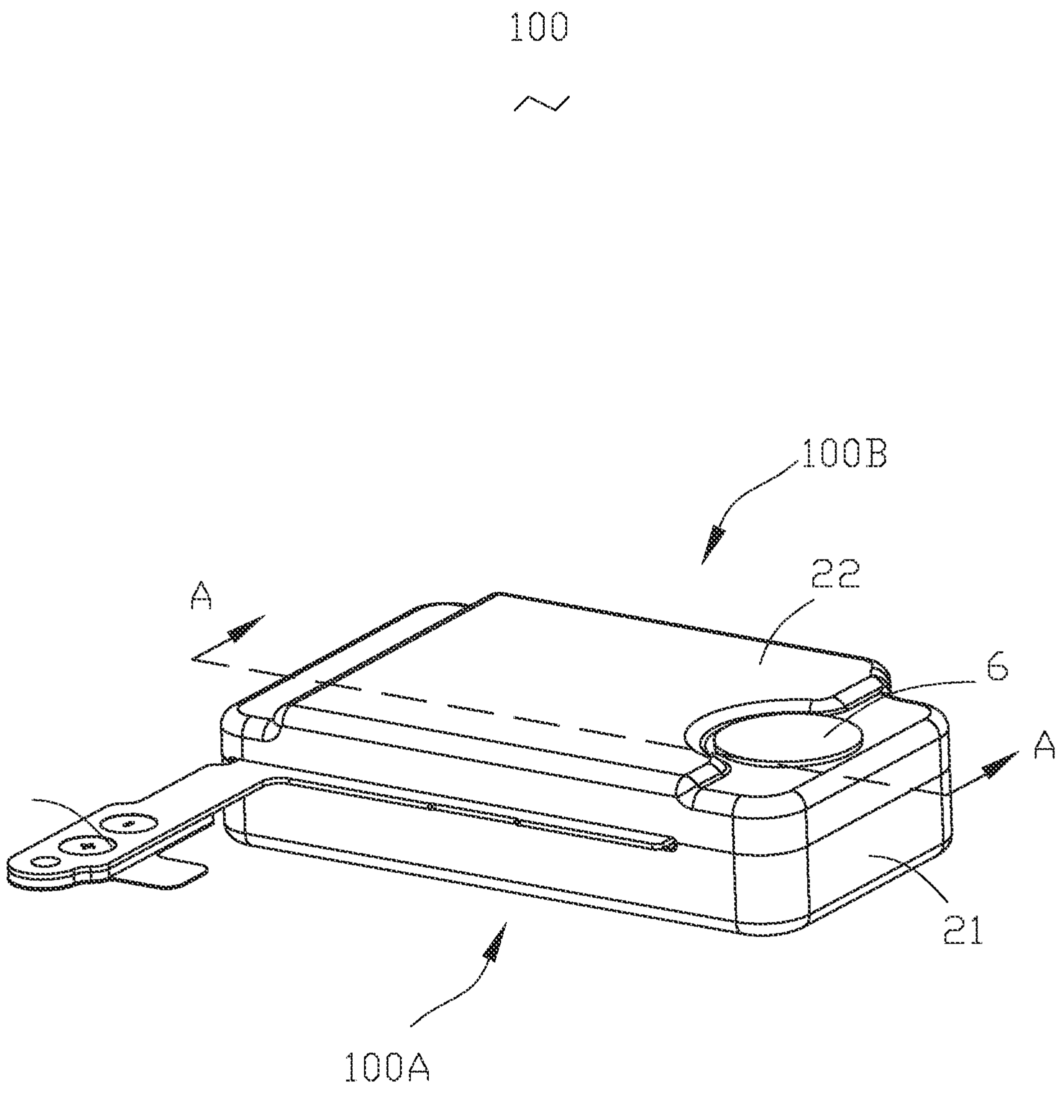
FIG. 2 is a schematic diagram of a three-dimensional structure of an acoustic device according to the present disclosure from another perspective.

As shown in FIG. 2 to FIG. 3, the acoustic device 100 further includes a filling hole 5 provided on the bottom wall 221 of the enclosure housing 2 and a hole cover 6 covering the filling hole 5. During the filling of the sound-absorbing material, the filling cavity C22 and the hollow portion 3L are filled with the sound-absorbing material via the filling hole 5. After the filling of the sound-absorbing material is completed, the filling hole is covered with the hole cover 6.

Figure 1:
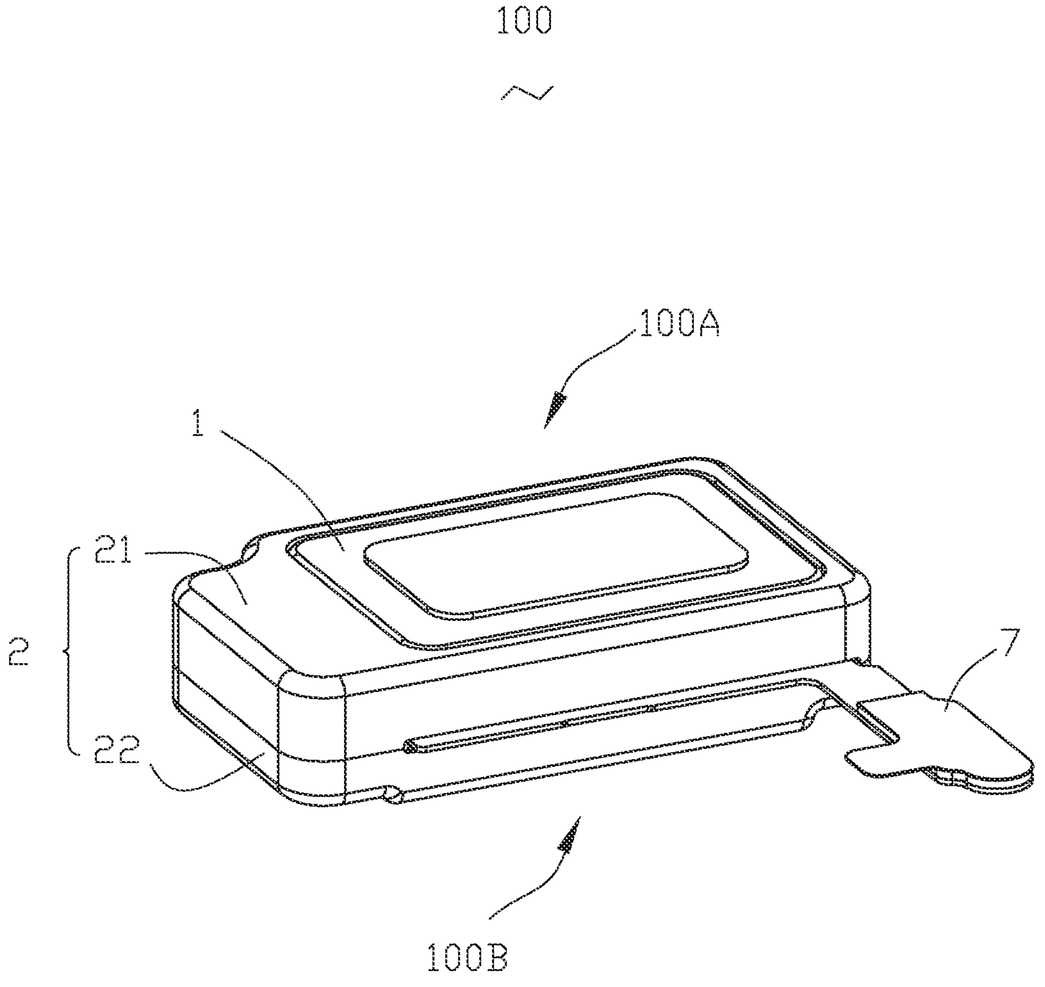
FIG. 1 is a schematic diagram of a three-dimensional structure of an acoustic device according to the present disclosure from one perspective.

As shown in FIG. 1 to FIG. 3, the acoustic device 100 further includes a circuit board 7 for connection with an external circuit. The circuit board 7 extends from the interior of the enclosure housing 2 to the exterior of the enclosure housing 2.

Figure 4:
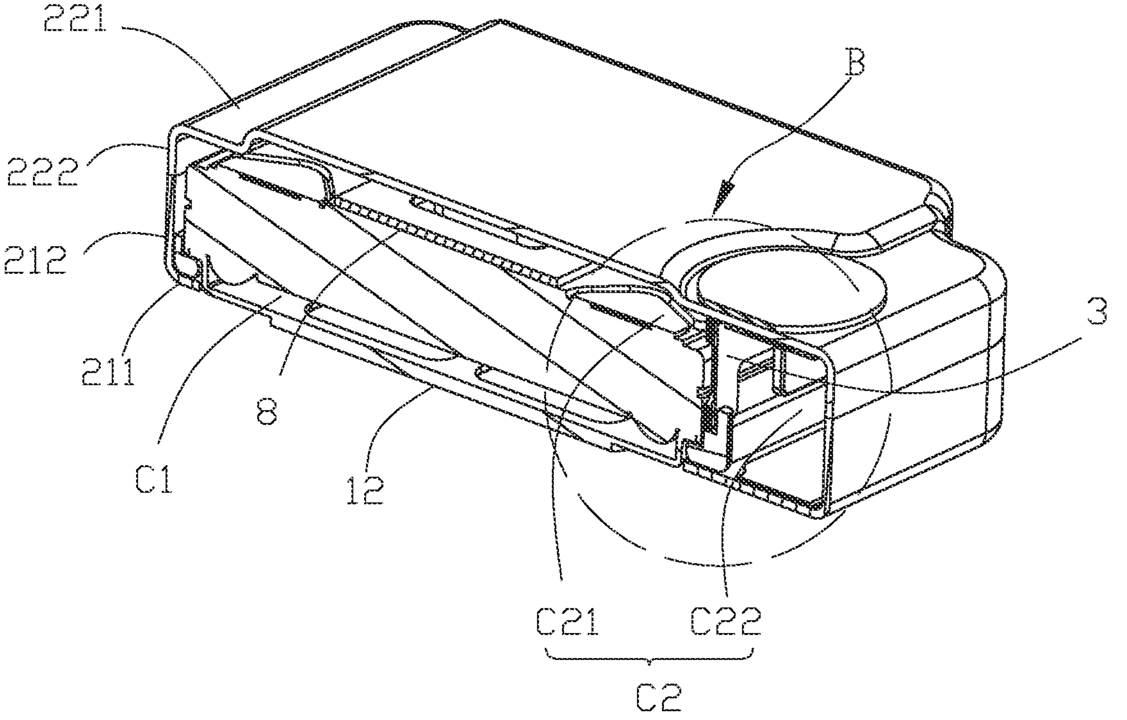
FIG. 4 is a three-dimensional sectional view of an acoustic device according to the present disclosure.

As shown in FIG. 3 to FIG. 4, the acoustic device 100 further includes a mounting plate 8 arranged on one side of the acoustic component 1 close to the rear surface. The mounting plate 8 abuts against the acoustic component 1 and is fixed to the enclosure housing 2, so as to fix the acoustic component 1 into the enclosure housing 2. The mounting plate 8 is made of stainless steel or carbon steel.

Figure 5:
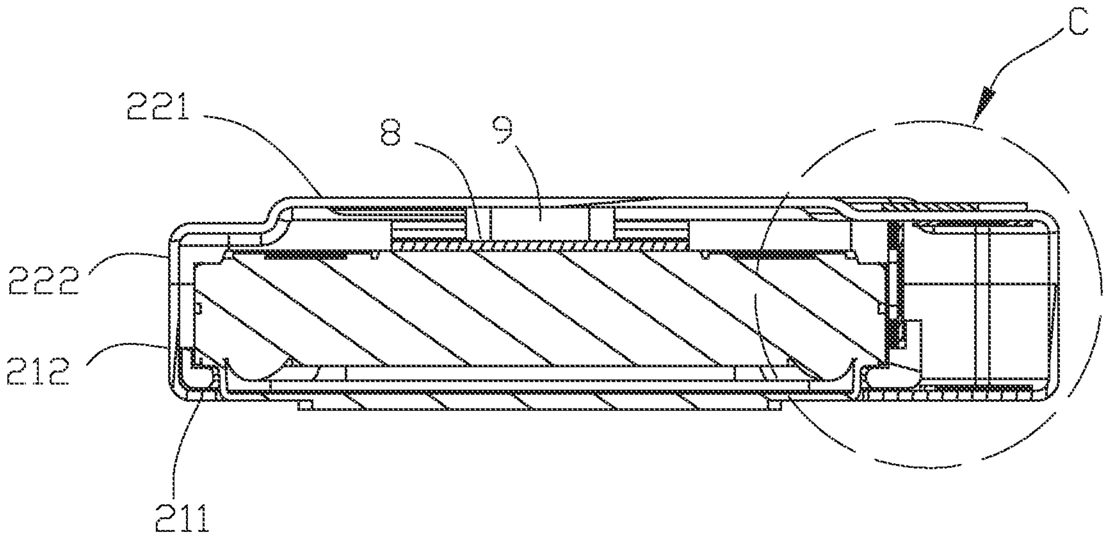
FIG. 5 is a sectional view taken along a direction A-A in FIG. 2.

As shown in FIG. 3 to FIG. 5, the acoustic device 100 further includes a stop 9 sandwiched between the acoustic component 1 and the bottom wall 221 of the enclosure housing. The stop 9 is a damper that may be configured to restrict the position of the acoustic component 1 to prevent fall-off. In an embodiment, the stop 9 is partially received in a receiving hole in the middle of the mounting plate 8.

As shown in FIG. 3 to FIG. 7, the acoustic device 100 further includes a buffer 10. The buffer 10 has a mesh structure, which is glued to a cavity wall of the filling cavity, specifically the inner surface of the enclosure housing 2 defining the filling cavity. A plurality of buffers 10 may be provided, which may be attached to any position of the front wall 211, the bottom wall 221, and the side walls 212 and 222 of the enclosure housing.

In an embodiment, a buffer is arranged in the filling cavity, which can reduce collision of the sound-absorbing material with the metallic enclosure housing, thereby reducing noise generated from the collision, so as to improve the acoustic performance.

The above are only preferred embodiments of the present disclosure and are not intended to limit the present disclosure. For those skilled in the art, the present disclosure may be subject to various modifications and changes. Any modification, equivalent replacement, improvement and the like within the spirit and principle of the present disclosure all fall within the protection scope of the present disclosure.

What is claimed is:

1. An acoustic device, wherein the acoustic device has a front surface and a rear surface, the front surface is provided with a sound outlet, and the acoustic device comprises:

an enclosure housing that is a metal housing;

an acoustic component mounted in the enclosure housing, wherein the acoustic component and the enclosure housing cooperate to form a front sound cavity and a rear sound cavity, and the front sound cavity is communicated with the sound outlet;

an isolation component mounted in the rear sound cavity, wherein the isolation component and the enclosure housing enclose to form a filling cavity configured to be filled with a sound-absorbing material; and at least one buffer attached to an inner surface of the enclosure housing defining the filling cavity, wherein the buffer is configured to reduce noise generated from collision of the sound-absorbing material with the enclosure housing.

2. The acoustic device as described in claim 1, wherein the buffer has a mesh structure.

3. The acoustic device as described in claim 1, wherein the buffer is glued to the inner surface of the enclosure housing.

4. The acoustic device as described in claim 1, wherein the enclosure housing comprises a front wall located on the front surface, a bottom wall located on the rear surface, and a side wall connecting the front wall to the bottom wall, a side surface of the acoustic component is spaced from the side wall of the enclosure housing, the isolation component closely fits the side surface, and the isolation component and the front wall, the side wall and the bottom wall of the enclosure housing together enclose to form the filling cavity.

5. The acoustic device as described in claim 4, wherein the isolation component is provided with at least one hollow portion to enable the side surface of the acoustic component to be exposed to the filling cavity.

6. The acoustic device as described in claim 1, wherein the isolation component comprises a support member, the support member is provided with at least one opening, the isolation component further comprises an isolation member attached to the support member, the isolation member covers the opening, and the isolation member has a mesh structure.

7. The acoustic device as described in claim 4, further comprising a cushion edge arranged in the enclosure housing and fixed to the enclosure housing, wherein the cushion edge is made of a nonmetallic material, and the isolation component is fixed to the cushion edge.

8. The acoustic device as described in claim 7, wherein the cushion edge is arranged on an inner surface of the front wall of the enclosure housing, and the acoustic component abuts against and is fixed to the cushion edge.

9. The acoustic device as described in claim 4, wherein the acoustic component comprises an acoustic unit and a front cover covering one side of the acoustic unit close to the front surface, and the front cover is provided with the sound outlet; and the front wall of the enclosure housing is provided with an avoiding opening to receive the front cover.

10. The acoustic device as described in claim 9, wherein the acoustic unit comprises a diaphragm, the diaphragm is opposite to the front cover and defines the front sound cavity together with the front cover, one side of the diaphragm close to the rear surface defines the rear sound cavity together with the enclosure housing, the isolation component divides the rear sound cavity into a first rear sound cavity and a second rear sound cavity, and the second rear sound cavity is the filling cavity.

* * * * *